US012769632B2

(12) United States Patent
Wang et al.

(10) Patent No.: US 12,769,632 B2
(45) Date of Patent: Oct. 20, 2026

(54) GEOMETRIC-AWARE DISTANCE MEASURE FOR PERFORMANCE TESTING ANALYSIS

(71) Applicant: Dell Products L.P., Round Rock, TX (US)

(72) Inventors: Zijia Wang, London (GB); Min Gong, Shanghai (CN); Mustafa Albado, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/976,441

(22) Filed: Dec. 11, 2024

(65) Prior Publication Data

US 2026/0161523 A1 Jun. 11, 2026

(51) Int. Cl.
*G06F 11/30* (2006.01)
*G06F 11/32* (2006.01)

(52) U.S. Cl.
CPC ...... *G06F 11/3072* (2013.01); *G06F 11/3034* (2013.01); *G06F 11/3051* (2013.01); *G06F 11/323* (2013.01)

(58) Field of Classification Search
CPC ............. G06F 11/3072; G06F 11/3034; G06F 11/3051; G06F 11/323
USPC ................................................ 714/47.2, 47.3
See application file for complete search history.

(56) References Cited

U.S. PATENT DOCUMENTS

2021/0209851 A1* 7/2021 Xu ............................ G06T 7/74
2021/0286695 A1* 9/2021 Zhou ...................... G06Q 10/20
2023/0038164 A1* 2/2023 Naeini .................. G06N 5/022
2023/0306258 A1* 9/2023 Assael ................. G06N 3/0464
2024/0264131 A1* 8/2024 Wouters ............ G01N 30/8662

FOREIGN PATENT DOCUMENTS

CN 118042416 A * 5/2024 ............. G16Y 40/60

OTHER PUBLICATIONS

Feng et al., English translation of CN-118042416-A, published May 14, 2024 (Year: 2024).*

* cited by examiner

*Primary Examiner* — Chae M Ko
(74) *Attorney, Agent, or Firm* — Krishnendu Gupta; Lesley Leonessa

(57) ABSTRACT

Methods, system, and non-transitory processor-readable storage medium for higher-level service health are provided herein. An example method includes transforming, by a monitoring system, time series data into graph representations. The monitoring system extracts graph features from the graph representations. The monitoring system computes a hybrid distance metric by combining Sum of Squared Distances (SSD) and Fréchet Distance and generates a similarity score based on the hybrid distance metric, where the similarity score evaluates time series data similarity in performance measurements.

19 Claims, 8 Drawing Sheets

MONITORING SYSTEM 106

Algorithm 1 Graph Feature Extraction procedure GraphFeatureExtraction($G$)<br>
$n \leftarrow$ *number of nodes in G*<br>
$F \leftarrow$ *an empty vector of size* $m$Sum of node degrees<br>
for $i \leftarrow 1$ to $n$ do<br>
$f_1 \leftarrow f_1 + degree(v_i)$ Sum of node degrees<br>
$f_2 \leftarrow f_2 + clustering(v_i)$ Sum of clustering coefficients<br>
$f_3 \leftarrow f_3 + closeness(v_i)$ Sum of closeness centralities<br>
$f_4 \leftarrow f_4 + betweenness(v\_i)$ Sum of betweenness centralities<br>
end for<br>
for $i \leftarrow 1$ to $n - 1$ do<br>
for $j \leftarrow i + 1$ to $n$ do<br>
$f_5 \leftarrow f_5 + shortest$ path$(v_i, v_j)$ Sum of shortest path lengths<br>
end for<br>
end for<br>
$F \leftarrow \{f_1, f_2, \ldots, f_5\}$<br>
return F<br>
end procedure

FIG. 5

Algorithm 2 Hybrid Distance Metric procedure HybridDistanceMetric($X,Y$)
$n \leftarrow lengthofXandY$
$G_X \leftarrow GraphConstruction(X)$ Construct the graph for $X$
$G_Y \leftarrow GraphConstruction(Y)$ Construct the graph for $Y$
$F_X \leftarrow GraphFeatureExtraction(G_X)$ Extract the graph features for $X$
$F_Y \leftarrow GraphFeatureExtraction(G_Y)$ Extract the graph features for $Y$
$D_S \leftarrow 0$ Initialize the SSD component
$D_F \leftarrow 0$ Initialize the Fr´echet Distance component for $i \leftarrow 1 to n$ do
$D_S \leftarrow D_S + (x_i - y_i)^2$ Compute the SSD component end for
$D_F \leftarrow FrechetDistance(F_X, F_Y)$ Compute the Fr´echet Distance component
$w_S \leftarrow AdaptiveWeighting(X,Y)$ Compute the weight for the SSD component
$w_F \leftarrow 1 - w_S$ Compute the weight for the Fr´echet Distance component
$D \leftarrow w_S \times D_S + w_F \times D_F$ Compute the hybrid distance metric
return $D$
end procedure

FIG. 6

GEOMETRIC-AWARE DISTANCE MEASURE FOR PERFORMANCE TESTING ANALYSIS

FIELD

The field relates generally to distributed and micro-service-based information processing systems, and more particularly to monitoring performance in such systems.

BACKGROUND

In the field of distributed and micro-service-based systems, traditional performance measurement and analysis methods often struggle to accurately capture complex interdependencies and dynamic system behaviors. Existing approaches often overlook structural interdependencies inherent in distributed systems and underutilize valuable statistical properties, resulting in fragmented performance analysis and limited predictive capabilities.

SUMMARY

Illustrative embodiments provide techniques for implementing a monitoring system in a storage system that detects anomalies. For example, illustrative embodiments transform, by a monitoring system, time series data into graph representations. The monitoring system extracts graph features from the graph representations. The monitoring system computes a hybrid distance metric by combining Sum of Squared Distances (SSD) and Fréchet Distance and generates a similarity score based on the hybrid distance metric, where the similarity score evaluates time series data similarity in performance measurements. These and other illustrative embodiments include, without limitation, apparatus, systems, methods and processor-readable storage media.

BRIEF DESCRIPTION OF THE DRAWINGS

FIG. 5 illustrates an example algorithm used by the graph feature extraction module, in an illustrative embodiment.

FIG. 6 illustrates an example algorithm of the hybrid distance metric module, in an illustrative embodiment.

DETAILED DESCRIPTION

Figure 1:
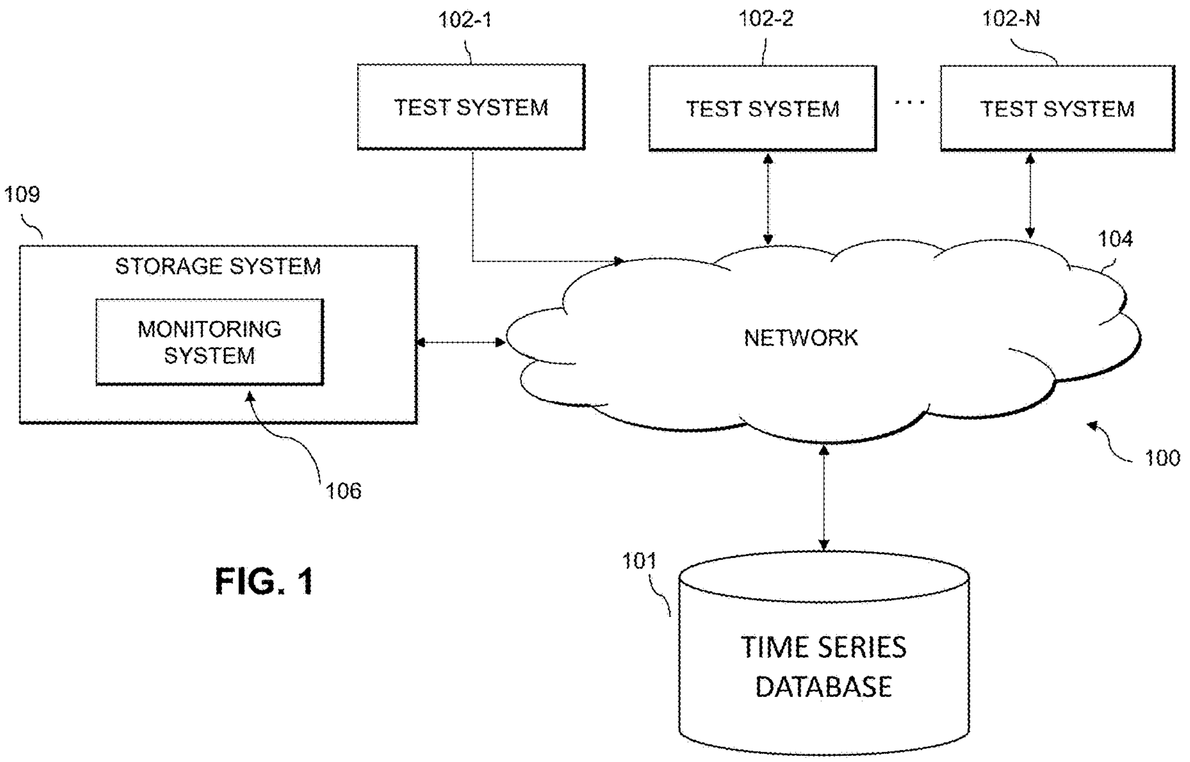
FIG. 1 shows an information processing system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a monitoring system, which technique may be used to provide, among other things, transforming, by a monitoring system, time series data into graph representations. The monitoring system extracts graph features from the graph representations. The monitoring system computes a hybrid distance metric by combining Sum of Squared Distances (SSD) and Fréchet Distance and generates a similarity score based on the hybrid distance metric, where the similarity score evaluates time series data similarity in performance measurements. Other types of processing devices can be used in other embodiments.

Conventional technologies that detect anomalies fail to capture both spatial and temporal similarities in time series data and fail to balance these similarities dynamically. Conventional technologies overlook the geometric and structural intricacies inherent in time series data, leading to suboptimal performance evaluation and anomaly detection. Conventional technologies fail to capture both the overall anomalies and the geometrical similarity of time series shapes. Conventional technologies fail to leverage the information available in the statistical properties of time series data, such as variance, skewness, or kurtosis. Conventional technologies struggle to accurately represent the sequential nature and timing of events in distributed systems. Conventional technologies focus on retrospective analysis and lack the predictive capabilities required for proactive system management. Conventional technologies fail to provide a more nuanced evaluation of performance data. Conventional technologies fail to detect the complex geometric relationships. Conventional technologies fail to enable deeper analysis of temporal relationships and structural patterns through graph-based representations.

By contrast, in at least some implementations in accordance with the current technique as described herein, anomaly detection is achieved by transforming, by a monitoring system, time series data into graph representations. The monitoring system extracts graph features from the graph representations. The monitoring system computes a hybrid distance metric by combining Sum of Squared Distances (SSD) and Fréchet Distance and generates a similarity score based on the hybrid distance metric, where the similarity score evaluates time series data similarity in performance measurements.

Thus, a goal of the current technique is to provide a method and a system for providing a monitoring system. Another goal is to comprehensively analyze both spatial and temporal similarities. Another goal is to reduce false positives and negatives in anomaly detection by considering multiple aspects of the data simultaneously. Another goal is improved identification of subtle yet significant anomalies and trends. Another goal is to effectively monitor server infrastructure performance metrics. Another goal is to better handle complex distributed and micro-service-based systems. Yet another goal is to enable proactive performance prediction capabilities.

In at least some implementations in accordance with the current technique described herein, the use of a monitoring system can provide one or more of the following advantages: providing a more comprehensive analysis by capturing both spatial and temporal similarities, better handling of complex geometric relationships, the ability to capture structural interdependencies that are typically overlooked by conventional metrics, enhanced temporal dynamics analysis, providing an adaptive weighting mechanism in the hybrid metric tailored to the specific nature and requirements of the performance data being analyzed, and reduced false positives and negatives in anomaly detection by considering multiple aspects of the data simultaneously.

In contrast to conventional technologies, in at least some implementations in accordance with the current technique as described herein, a monitoring system transforms time series data into graph representations. The monitoring system extracts graph features from the graph representations. The monitoring system computes a hybrid distance metric by combining Sum of Squared Distances (SSD) and Fréchet Distance and generates a similarity score based on the hybrid distance metric, where the similarity score evaluates time series data similarity in performance measurements.

In an example embodiment of the current technique, the monitoring system creates nodes corresponding to points in the time series data and connects the nodes with edges based on visibility between corresponding points in the time series data.

In an example embodiment of the current technique, two points are considered visible to each other if a line segment connecting them does not intersect with any other point in the time series data.

In an example embodiment of the current technique, the monitoring system calculates a sum of node degrees, a sum of clustering coefficients, a sum of closeness centralities, a sum of betweenness centralities, and a sum of shortest path lengths.

In an example embodiment of the current technique, the sum of node degrees reflects complexity and variability of the time series data.

In an example embodiment of the current technique, the sum of clustering coefficients reflects local patterns and correlations of the time series data.

In an example embodiment of the current technique, the sum of closeness centralities reflects connectivity and centrality of the time series data.

In an example embodiment of the current technique, the sum of betweenness centralities reflects importance and influence of the time series data.

In an example embodiment of the current technique, the sum of shortest path lengths reflects distance and similarity between the time series data.

In an example embodiment of the current technique, the monitoring system calculates an SSD component measuring sum of squared differences between corresponding points, calculates a Fréchet Distance component using the extracted graph features, and combines the components using adaptive weights.

In an example embodiment of the current technique, the monitoring system, the SSD component is calculated as the the sum of squared differences between corresponding points of two time series datum.

In an example embodiment of the current technique, the monitoring system, the Fréchet Distance component is calculated using the graph features as input instead of raw time series data values.

In an example embodiment of the current technique, the adaptive weights are determined based on a length of the time series data, a variance of the time series data, a trend of the time series data, and a seasonality of the time series data.

In an example embodiment of the current technique, the SSD component weight is increased when lengths of two time series data exceed a predefined ratio range.

In an example embodiment of the current technique, the SSD component weight is increased when variances of two time series data exceed a predefined ratio range.

In an example embodiment of the current technique, the monitoring system, the Fréchet Distance component weight is increased when trends of two time series data exceed a predefined ratio range.

In an example embodiment of the current technique, the Fréchet Distance component weight is increased when seasonalities of two time series data exceed a predefined ratio range.

In an example embodiment of the current technique, the similarity score to detect performance anomalies by comparing observed performance curves to reference patterns.

In an example embodiment of the current technique, the monitoring system uses the similarity score to monitor server infrastructure performance metrics comprising at least one of central processing unit (CPU) usage, memory usage, disk input/output (I/O), network traffic, and system load.

In an example embodiment of the current technique, the monitoring system uses the similarity score to reduce false positives and false negatives in anomaly detection by capturing both overall anomalies and geometrical similarity of time series data shapes.

FIG. 1 shows a computer network (also referred to herein as an information processing system) 100 configured in accordance with an illustrative embodiment. The computer network 100 comprises a storage system 109 comprising a monitoring system 106, test systems 102-N, and time series database 101. The storage system 109, test systems 102-N, and time series database 101 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. As noted above, also coupled to network 104 is a storage system 109. Such storage systems can comprise any of a variety of different types of storage including network-attached storage (NAS), storage area networks (SANs), direct-attached storage (DAS) and distributed DAS, as well as combinations of these and other storage types, including software-defined storage.

The storage system 109 and test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The storage system 109 and test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the storage system 109 are one or more input-output devices, which illustratively comprise keyboards, displays or other types of input-output devices in any combination. Such input-output devices can be used, for example, to support one or more user interfaces to the storage system 109, as well as to support communication between storage system 109 and other related systems and devices not explicitly shown. One or more input-output devices may also be associated with any of the storage system 109 and test systems 102-N.

Additionally, the storage system 109 in the FIG. 1 embodiment is assumed to be implemented using at least one processing device. Each such processing device generally comprises at least one processor and an associated memory, and implements one or more functional modules for controlling certain features of the storage system 109.

More particularly, the storage system 109 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the storage system 109 to communicate over the network 104 with the test systems 102-N, and time series database 101, and illustratively comprises one or more conventional transceivers.

A monitoring system may be implemented at least in part in the form of software that is stored in memory and executed by a processor, and may reside in any of storage system 109 and/or test systems 102-N. The monitoring system may be a standalone plugin that may be included within a processing device. That processing device may be any of storage system 109, test systems 102-N, or any other processing device. The monitoring system may reside on processing devices separate from storage system 109 and/or test systems 102-N. In this example scenario, any of storage system 109 and test systems 102-N may send and receive messages to the separate processing devices to access the methods of the monitoring system.

It is to be understood that the particular set of elements shown in FIG. 1 for storage system 109 involving test systems 102-N, and time series database 101 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the storage system 109 can be on and/or part of the same processing platform.

An exemplary process of an example monitoring system using storage system 109, test systems 102-N, and time series database 101 in computer network 100 will be described in more detail with reference to, for example, the flow diagram of FIG. 2, and FIG. 3.

Figure 2:
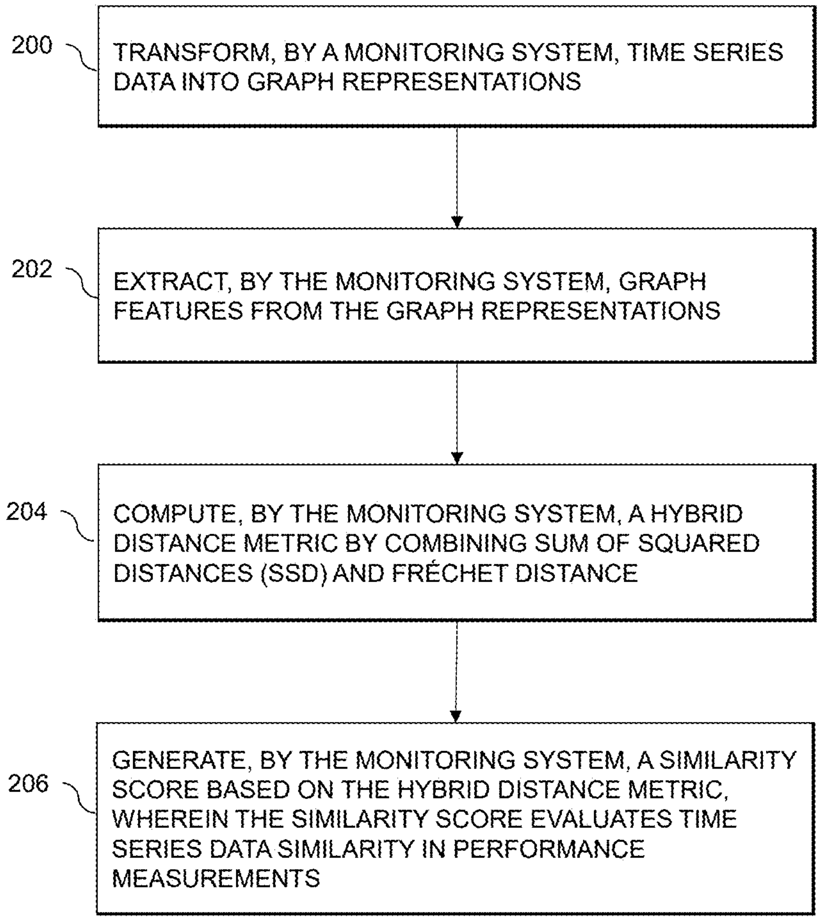
FIG. 2 shows a flow diagram of a process for a monitoring system, in an illustrative embodiment.
Figure 3:
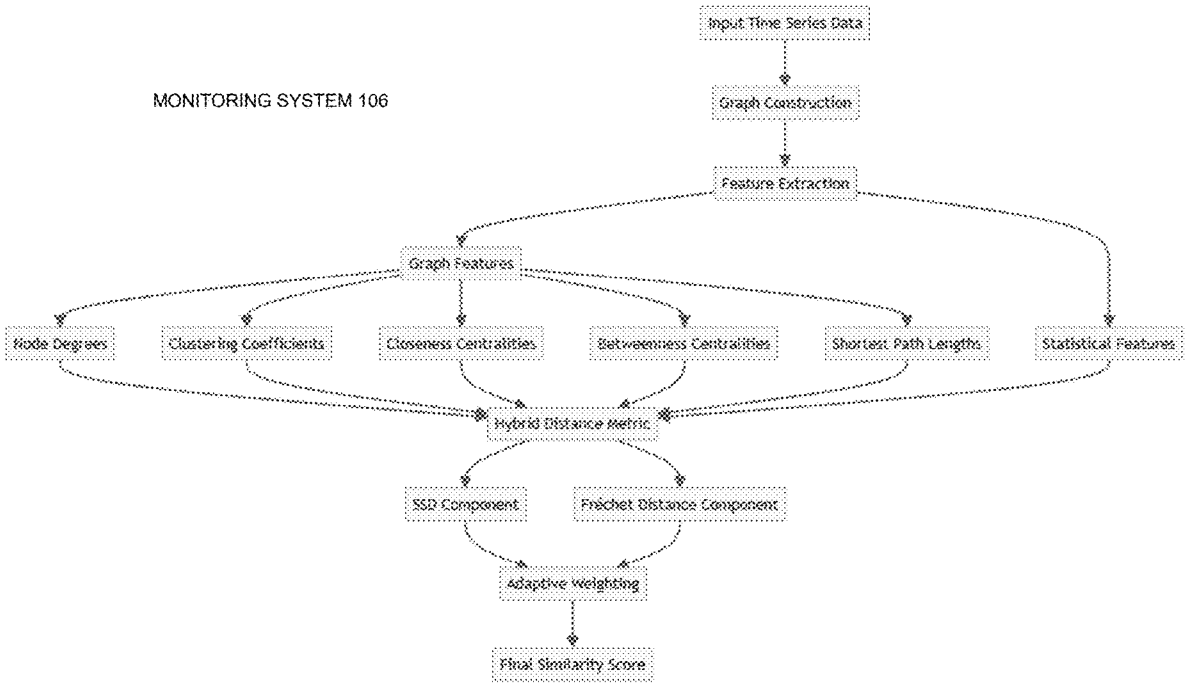
FIG. 3 shows example details of a monitoring system, in an illustrative embodiment.

FIG. 2 is a flow diagram of a process for a monitoring system in an illustrative embodiment. It is to be understood that this particular process is only an example, and additional or alternative processes can be carried out in other embodiments.

At 200, the monitoring system 106 transforms time series data (sometimes referred to as "time series") into graph representations. In an example embodiment, the time series data is performance measurement time series data comprising real-time infrastructure metrics from one or more computing systems, such as test systems 102-N. In an example embodiment, the monitoring system 106 comprises four modules, a graph construction module, a graph feature extraction module, a hybrid distance metric module, and an adaptive weighting mechanism module, as illustrated in FIG. 3. In an example embodiment, a graph construction module associated with the monitoring system 106 transforms the raw time series data into graph representations, to enhance the understanding of temporal relationships and structural dependencies. In an example embodiment, the graph construction module creates nodes corresponding to points in the time series data and connects the nodes with edges based on visibility between corresponding points in the time series data. In an example embodiment, two points are considered visible to each other if a line segment connecting them does not intersect with any other point in the time series data.

Figure 4:
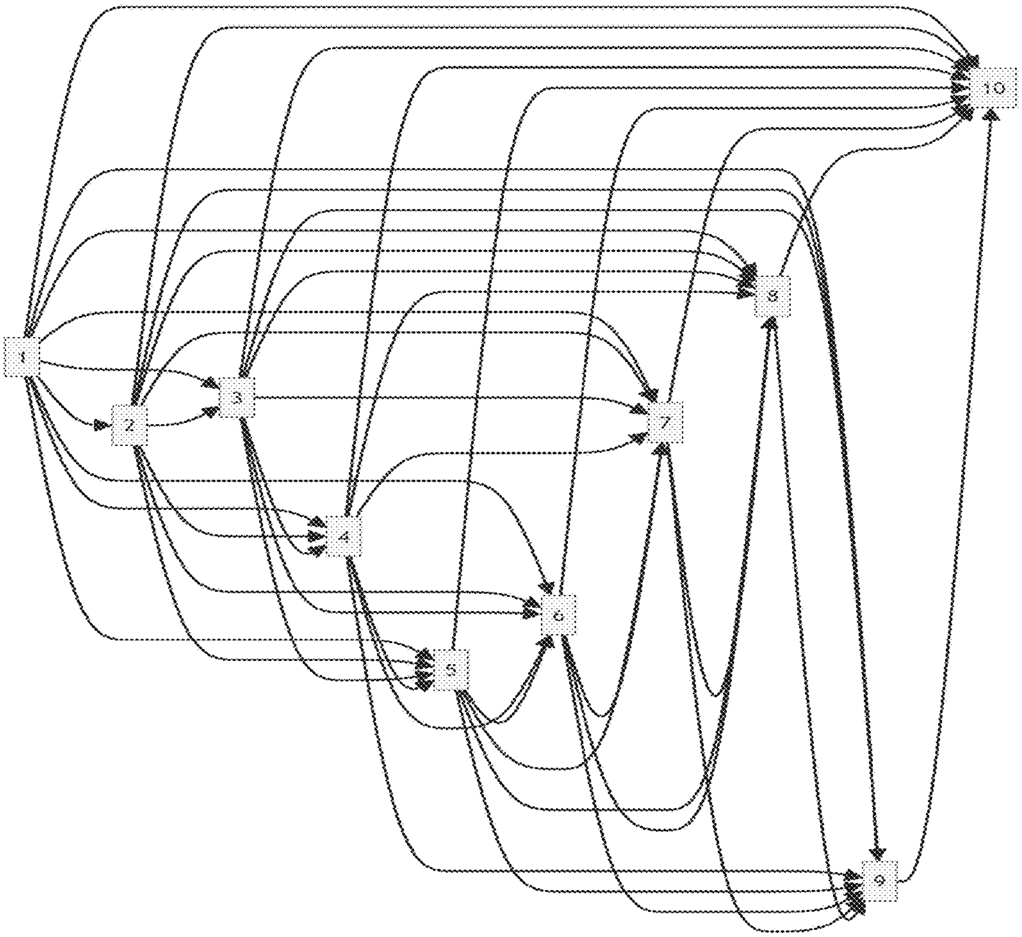
FIG. 4 illustrates an example visibility graph constructed from time series data, in an illustrative embodiment.

Typically, a graph is a mathematical structure comprising of a set of nodes and a set of edges that connect pairs of nodes. Nodes can represent entities, events, or states, while edges can represent relationships, interactions, or transitions. In an example embodiment, the graph construction module constructs a visibility graph. In a visibility graph, each point in the time series data corresponds to a node in the graph, and two nodes are connected by an edge if the corresponding points are visible to each other. For example, a point $p_i$ is visible to another point $p_j$ if the line segment connecting $p_i$ and $p_j$ does not intersect with any other point in the time series data. FIG. 4 illustrates an example visibility graph constructed from time series data. The visibility graph created by the graph construction module captures the temporal order and the geometric shape of the time series data, as well as the local and global patterns. The numbers in the nodes represent the order of the points in the time series data. The edges represent the visibility between the points. For example, the peaks and valleys of the time series correspond to the nodes with high degree (number of edges) in the graph, while the flat segments correspond to the nodes with low degree. The visibility graph can also reflect the trend, seasonality, and periodicity of the time series, as well as the outliers and anomalies.

In an example embodiment, the graph construction module processes time series data of different lengths, scales, and domains, and produces consistent and comparable graph representations. In an example embodiment, the graph construction module takes as input time series data $X=\{x_1, x_2, \ldots, x_n\}$, where $x_i$ is the value of the time series data at time i, and n is the length of the time series data. The output of the graph construction module is a graph G=(V,E), where $V=\{v_1, v_2, \ldots, v_n\}$ is the set of nodes, and $E=\{(v_i, v_j)|i<j$, $x_i$ and $x_j$ are visible to each other$\}$ is the set of edges.

At 202, the monitoring system 106 extracts graph features from the graph representations using graph theory algorithms, capturing the geometric and structural characteristics of the time series data. The monitoring system 106 comprises a graph feature extraction module. The graph feature extraction module extracts relevant features from the graphs constructed by the graph construction module. The relevant features capture the geometric and structural characteristics of time series, such as the shape, complexity, variability, and connectivity. In an example embodiment, the graph feature extraction module calculates a sum of node degrees, a sum of clustering coefficients, a sum of closeness centralities, a sum of betweenness centralities, and a sum of shortest path lengths. These features capture the geometric and structural characteristics of the time series. The monitoring system 106 also comprises the hybrid distance metric module, and the graph features are the input for the Fréchet Distance component of the hybrid distance metric module.

In an example embodiment, the sum of node degrees reflects complexity and variability of the time series data. The sum of node degrees measures the total number of edges in the graph, reflecting the complexity and variability of the time series. A high value of this feature indicates that the time series has many peaks and valleys, while a low value indicates that the time series is flat or smooth.

In an example embodiment, the sum of clustering coefficients reflects local patterns and correlations of the time series data. The sum of clustering coefficients measures the tendency of nodes to form clusters or groups, reflecting the local patterns and correlations of the time series. A high value of this feature indicates that the time series has strong local dependencies, while a low value indicates that the time series is random or independent.

In an example embodiment, the sum of closeness centralities reflects connectivity and centrality of the time series data. The sum of closeness centralities measures the average distance of nodes to all other nodes in the graph, which reflects the connectivity and centrality of the time series. A high value of this feature indicates that the time series is well-connected and has a central point, while a low value indicates that the time series is sparse and has no dominant point.

In an example embodiment, the sum of betweenness centralities reflects importance and influence of the time series data. The sum of betweenness centralities measures the number of times a node acts as a bridge along the shortest path between two other nodes, reflecting the importance and influence of the time series. A high value of this feature indicates that the time series has a significant role in the structure of the graph, while a low value indicates that the time series is peripheral or irrelevant.

In an example embodiment, the sum of shortest path lengths reflects distance and similarity between the time series data. The sum of shortest path lengths measures the total length of the shortest paths between all pairs of nodes in the graph, reflecting the distance and similarity of the time series. A high value of this feature indicates that the time series is distant and dissimilar to other time series, while a low value indicates that the time series is close and similar to other time series.

In an example embodiment, the graph feature extraction module takes as input a graph G=(V,E), where $V=\{v_1, v_2, \ldots, v_n\}$ is the set of data points, and $E=\{(v_i, v_j)|i<j$, $x_i$ and $x_j$ are visible to each other$\}$ is the set of edges. The output of the graph feature extraction module is a feature vector $F=\{f_1, f_2, \ldots f_m\}$, where $f_i$ is the value of the i-th feature, and m is the number of features. FIG. 5 illustrates an example algorithm used by the graph feature extraction module.

At 204, the monitoring system 106 computes a hybrid distance metric by combining Sum of Squared Distances (SSD) and Fréchet Distance to evaluate performance deviations. In an example embodiment, the hybrid distance metric module determines the distance between two time series by combining the Sum of Squared Distances (SSD) and Fréchet Distance. The SSD measures the sum of squared differences between corresponding points of two time series, capturing the overall anomalies. One way to describe the Fréchet Distance is that it measures the minimum length of a leash that connects a dog and its owner walking along two time series data, capturing the shape similarity. The hybrid distance metric balances the importance of spatial and temporal similarities, and provides a more comprehensive and accurate measure of time series similarity. FIG. 6 illustrates an example algorithm of the hybrid distance metric module.

In an example embodiment, the hybrid distance metric module takes as input two time series data $X=\{x_1, x_2, \ldots, x_n\}$ and $Y=\{y_1, y_2, \ldots, y_n\}$, where x and $y_i$ are the values of the time series at time i, and n is the length of the time series. The output of the module is a distance value D, which represents the similarity between X and Y.

In an example embodiment, the hybrid distance metric module determines the hybrid distance metric by calculating an SSD component measuring sum of squared differences between corresponding points, calculating a Fréchet Distance component using the extracted graph features and then combining the components using adaptive weights.

In an example embodiment, the SSD component is calculated as the sum of squared differences between corresponding points of two time series datum. The SSD component measures the sum of squared differences between corresponding points of two time series, which can capture the overall anomalies. The SSD component is defined as follows:

$$D_S(X, Y) = \sum_{i=1}^{n} (x_i - y_i)^2$$

where $x_i$ and $y_i$ are the values of the time series at time i, and n is the length of the time series.

In an example embodiment, the hybrid distance metric module calculates the Fréchet Distance component using the graph features as input instead of raw time series data values to incorporate the temporal and structural information into the distance calculation. Using the dog leash analogy again, the Fréchet Distance component measures the minimum length of a leash that connects a dog and its owner walking along two time series, which can capture the shape similarity. The Fréchet Distance component is defined as follows:

$$D_F(X, Y) = \min\max d(\alpha(t), \beta(t))$$
$$\alpha, \beta t \in [0,1]$$

where α and β are continuous and monotonically increasing functions that map the parameter t to the points on the time series X and Y, respectively, and d is a distance function that measures the distance between two points.

In an example embodiment, the hybrid distance metric module combines the SSD component and the Fréchet Distance component using a weighted sum. In an example embodiment, the weighted sum is defined as follows:

$$D(X, Y) = w_S \times D_S(X, Y) + w_F \times D_F(X, Y)$$

where $w_S$ and $w_F$ are the weights for the SSD and Fréchet Distance components, respectively, and $w_S+w_F=1$. The weights balance the importance of spatial and temporal similarities, and can be adjusted by the adaptive weighting mechanism module.

The hybrid distance metric module computes the distance between two time series by combining the SSD and Fréchet Distance components, capturing both the overall anomalies and the geometrical similarity of time series shapes.

In an example embodiment, the monitoring system 106 incorporates statistical analysis to complement geometric and temporal features to provide insights into how the data is distributed in the time series data. The main features analysed include variance, skewness, and kurtosis. Variance shows how much the data fluctuates, skewness highlights whether the data leans more toward high or low values, and kurtosis captures sharp spikes or outliers.

For example, consider two time series; a stable time series such as 10, 15, 20, 25 would have low variance and neutral skewness, while a time series such as 10, 15, 30, 10, 25 would have high variance and positive skewness, reflecting its instability and sharp peaks. This difference is critical for identifying patterns that simple geometric measures might miss.

These features integrate directly into the hybrid distance metric. Variance, for instance, adjusts the weight of the Sum of Squared Distances (SSD), making it more sensitive to local fluctuations. Skewness and kurtosis, on the other hand, influence the Fréchet Distance, enhancing its ability to capture the overall shape of the data.

The adaptive weighting mechanism dynamically balances these metrics based on the statistical features. For example, if the data shows high variance, SSD might carry more weight. Conversely, if skewness or kurtosis is high, the Fréchet Distance becomes more significant.

By combining these statistical insights with the hybrid metric, the monitoring system 106 adapts to different datasets and scenarios. This ensures a robust analysis, capturing both local details and global trends effectively, making it a powerful tool for anomaly detection and similarity evaluation.

At 206, the monitoring system 106 generates a similarity score based on the hybrid distance metric, where the similarity score evaluates time series data similarity in performance measurements. In an example embodiment, the monitoring system 106 generates an adaptive similarity score, where the similarity score identifies performance anomalies in a computing system, such as test system 102-N. In an example embodiment, the monitoring system 106 automatically adjusting computer system resources based on the identified performance anomalies. In an example embodiment, the adaptive weighting mechanism module adjusts the weights of SSD and Fréchet Distance in the hybrid distance metric, according to the nature and requirements of the performance data being statistically analysed. In an example embodiment, the adaptive weighting mechanism module determines the adaptive weights based on a length of the time series data, a variance of the time series data, a trend of the time series data, and a seasonality of the time series data. The adaptive weighting mechanism balances the importance of spatial and temporal similarities, and tailors the metric to the specific application and data domain.

In an example embodiment, the adaptive weighting mechanism module takes as input two time series data $X=\{x_1, x_2, \ldots, x_n\}$ and $Y=\{y_1, y_2, \ldots, y_n\}$, where $x_i$ and $y_i$ are the values of the time series at time i, and n is the length of the time series. The output of the adaptive weighting mechanism module is a weight value $w_S$, representing the weight for the SSD component in the hybrid distance metric. The weight for the Fréchet Distance component is $w_F=1-w_S$. In an example embodiment, the adaptive weighting mechanism module uses four criteria, length, variance, trend, and seasonality.

The length criterion measures the number of points in the time series data, reflecting the duration and resolution of the time series. In an example embodiment, the SSD component weight is increased when lengths of two time series data exceed a predefined ratio range. If the lengths of the two time series data are significantly different, the SSD component should have a higher weight, as the Fréchet Distance component may not be able to align the points properly. In an example embodiment, "significantly different" can mean the lengths between two time series data is more than 10% of the shorter series, or exceeds an absolute difference of 50 points. Alternatively, "significantly different" can mean exceeding one standard sampling interval or falling outside a predefined ratio range, for example, 0.9 to 1.1. These definitions of "significantly different" may apply to any of length, variance, trend and seasonality.

The variance criterion measures the dispersion of the values in the time series data, reflecting the volatility and variability of the time series. In an example embodiment, the SSD component weight is increased when variances of two time series data exceed a predefined ratio range. If the variances of the two time series data are significantly different, the SSD component should have a higher weight, as the Fréchet Distance component may not be able to capture the magnitude of the differences.

The trend criterion measures the direction and slope of the time series, reflecting the long-term pattern and movement of the time series. In an example embodiment, the Fréchet Distance component weight is increased when trends of two time series data exceed a predefined ratio range. If the trends of the two time series data are significantly different, the Fréchet Distance component should have a higher weight, as the SSD component may not be able to capture the shape of the differences.

The seasonality criterion measures the periodic and cyclic fluctuations of the time series data, reflecting the short-term pattern and repetition of the time series. In an example embodiment, the Fréchet Distance component weight is increased when seasonalities of two time series data exceed a predefined ratio range. If the seasonalities of the two time series data are significantly different, the Fréchet Distance component should have a higher weight, as the SSD component may not be able to capture the shape of the differences.

In an example embodiment, the adaptive weighting mechanism module adjusts the weights of SSD and Fréchet Distance in the hybrid distance metric, according to the nature and requirements of the performance data being analysed.

In an example embodiment, the monitoring system 106 uses the similarity score to monitor server infrastructure performance metrics comprising at least one of central processing unit (CPU) usage, memory usage, disk input/output (I/O), network traffic, and system load. In an example scenario, performance of a server infrastructure is monitored to detect any anomalies or trends that could indicate issues, such as resource bottlenecks, hardware failures, or abnormal workload patterns. For example, the test systems 102-N may be monitored. Performance metrics are collected from the server infrastructure, such as CPU usage, memory usage, disk input/output (I/O), network traffic, system load, etc. The performance metrics are sampled at regular intervals, and stored in a time series database 101. A baseline is initialized for the expected consumptions for these resource in time series.

In an example embodiment, the deviations or anomalies are detected. The hybrid distance metric module calculates the SSD between consecutive data points of CPU usage, memory usage, and other metrics. High SSD values may indicate sudden spikes or fluctuations in resource usage. In an example embodiment, the reference patterns or templates for normal resource utilization are defined based on historical data or expected performance baseline. In an example embodiment, the monitoring system 106 uses the similarity score to detect performance anomalies by comparing observed performance curves to reference patterns. The hybrid distance metric module calculates the Fréchet Distance between the observed performance curves and the reference patterns. Any significant deviations may be indicative of anomalous behavior. In an example embodiment, the hybrid distance metric module reduces false positives and negatives. In an example embodiment, the monitoring system 106 uses the similarity score to reduce false positives and false negatives in anomaly detection by capturing both overall anomalies and geometrical similarity of time series data shapes.

The hybrid distance metric module determines the distance between two time series by combining the SSD component and the Fréchet Distance component to capture both the overall anomalies and the geometric similarity of times series shapes, and also to capture diverse types of anomalies and reduce false positives and negatives.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve anomaly detection by providing a more comprehensive analysis, capturing both spatial and temporal similarities. Embodiments disclosed herein provide better handling of complex geometric relationships. Embodiments disclosed herein capture structural interdependencies that are typically overlooked by conventional metrics. Embodiments disclosed herein provide enhanced temporal dynamics analysis. Embodiments disclosed herein reduce false positives and negatives in anomaly detection by considering multiple aspects of the data simultaneously. These and other embodiments can effectively improve how higher-level service health is monitored relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
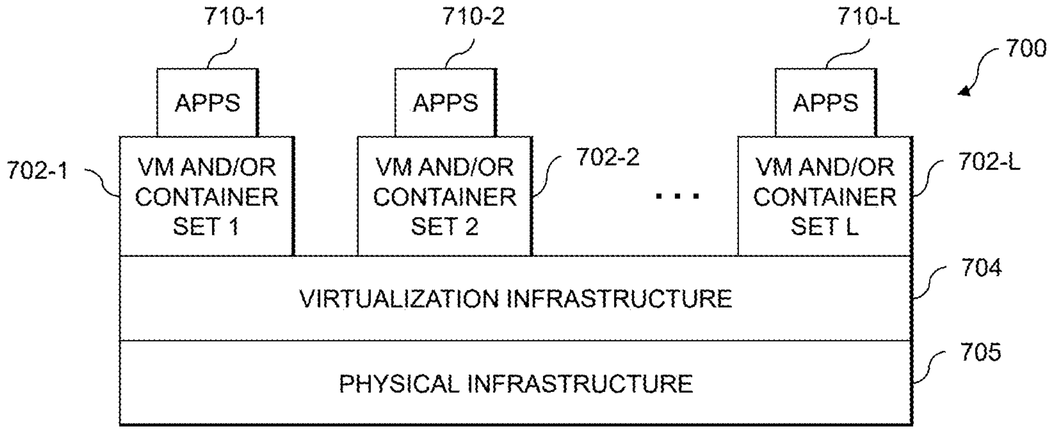
FIGS. 7 and 8 show examples of processing platforms that may be utilized to implement at least a portion of a higher-level service health embodiments.
Figure 8:
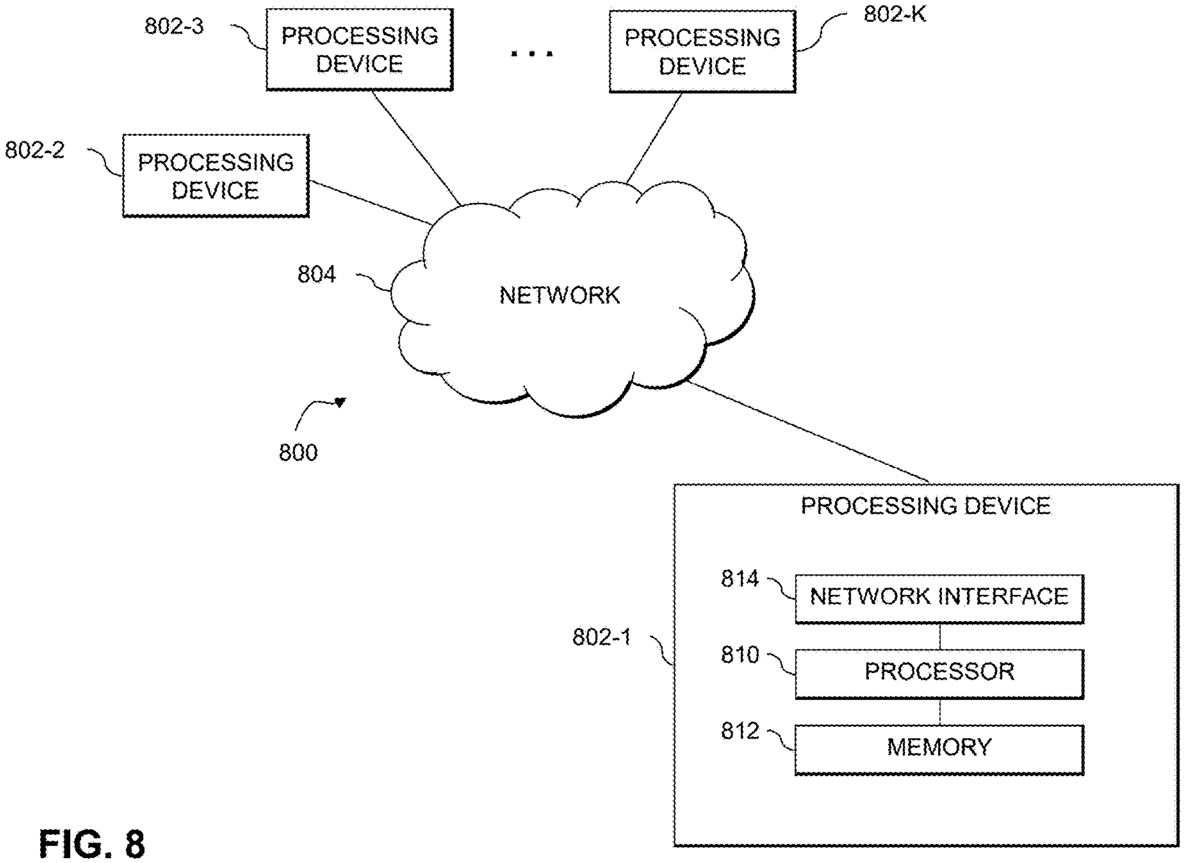

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, where the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

transforming, by a monitoring system, time series data into graph representations by creating nodes corresponding to points in the time series data and connecting the nodes with edges based on visibility between corresponding points in the time series data;

extracting, by the monitoring system, graph features from the graph representations;

computing, by the monitoring system, a hybrid distance metric by combining Sum of Squared Distances (SSD) and Fréchet Distance;

generating, by the monitoring system, a similarity score based on the hybrid distance metric, wherein the monitoring system compares the similarity score against a baseline performance curve to detect deviations indicative of performance anomalies in a computing system; and automatically adjusting, by the monitoring system, computing system resources based on the detected performance anomalies, wherein the method is implemented by at least one processing device comprising a processor coupled to a memory.

2. The method of claim 1, wherein two points are considered visible to each other if a line segment connecting them does not intersect with any other point in the time series data.

3. The method of claim 1, wherein extracting graph features comprises calculating:

a sum of node degrees;

a sum of clustering coefficients;

a sum of closeness centralities;

a sum of betweenness centralities; and a sum of shortest path lengths.

4. The method of claim 3, wherein the sum of node degrees reflects complexity and variability of the time series data.

5. The method of claim 3, wherein the sum of clustering coefficients reflects local patterns and correlations of the time series data.

6. The method of claim 3, wherein the sum of closeness centralities reflects connectivity and centrality of the time series data.

7. The method of claim 3, wherein the sum of betweenness centralities reflects importance and influence of the time series data.

8. The method of claim 3, wherein the sum of shortest path lengths reflects distance and similarity between the time series data.

9. The method of claim 1, wherein computing the hybrid distance metric comprises:

calculating an SSD component measuring sum of squared differences between corresponding points;

calculating a Fréchet Distance component using the extracted graph features; and combining the components using adaptive weights.

10. The method of claim 9, wherein the SSD component is calculated as the sum of squared differences between corresponding points of two time series datum.

11. The method of claim 9, wherein the Fréchet Distance component is calculated using the graph features as input instead of raw time series data values.

12. The method of claim 9, wherein the adaptive weights are determined based on:

a length of the time series data;

a variance of the time series data;

a trend of the time series data; and a seasonality of the time series data.

13. The method of claim 12, wherein the SSD component weight is increased when lengths of two time series data exceed a predefined ratio range.

14. The method of claim 12, wherein the SSD component weight is increased when variances of two time series data exceed a predefined ratio range.

15. The method of claim 12, wherein the Fréchet Distance component weight is increased when trends of two time series data exceed a predefined ratio range.

16. The method of claim 12, wherein the Fréchet Distance component weight is increased when seasonalities of two time series data exceed a predefined ratio range.

17. The method of claim 1, further comprising using the similarity score to monitor server infrastructure performance metrics comprising at least one of central processing unit (CPU) usage, memory usage, disk input/output (I/O), network traffic, and system load.

18. A system comprising:

at least one processing device comprising a processor coupled to a memory;

the at least one processing device being configured:

to transform, by a monitoring system, time series data into graph representations by creating nodes corresponding to points in the time series data and connecting the nodes with edges based on visibility between corresponding points in the time series data;

to extract, by the monitoring system, graph features from the graph representations;

to compute, by the monitoring system, a hybrid distance metric by combining Sum of Squared Distances (SSD) and Fréchet Distance;

to generate, by the monitoring system, a similarity score based on the hybrid distance metric, wherein the monitoring system compares the similarity score against a baseline performance curve to detect deviations indicative of performance anomalies in a computing system; and automatically adjusting, by the monitoring system, computing system resources based on the detected performance anomalies.

19. A computer program product comprising a non-transitory processor-readable storage medium having stored therein program code of one or more software programs, wherein the program code when executed by at least one processing device causes said at least one processing device:

to transform, by a monitoring system, time series data into graph representations by creating nodes corresponding to points in the time series data and connecting the nodes with edges based on visibility between corresponding points in the time series data;

to extract, by the monitoring system, graph features from the graph representations;

to compute, by the monitoring system, a hybrid distance metric by combining Sum of Squared Distances (SSD) and Fréchet Distance;

to generate, by the monitoring system, a similarity score based on the hybrid distance metric, wherein the monitoring system compares the similarity score against a baseline performance curve to detect deviations indicative of performance anomalies in a computing system; and automatically adjusting, by the monitoring system, computing system resources based on the detected performance anomalies.

* * * * *